United States Patent
Domejean et al.

(10) Patent No.: US 6,987,657 B2
(45) Date of Patent: Jan. 17, 2006

(54) VOLTAGE SURGE PROTECTION DEVICE

(75) Inventors: Eric Domejean, Voreppe (FR); Marc Rival, Saint Ismier (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 10/514,472

(22) PCT Filed: Apr. 9, 2003

(86) PCT No.: PCT/FR03/01109

§ 371 (c)(1),
(2), (4) Date: Nov. 16, 2004

(87) PCT Pub. No.: WO03/102991

PCT Pub. Date: Dec. 11, 2003

(65) Prior Publication Data

US 2005/0174716 A1    Aug. 11, 2005

(30) Foreign Application Priority Data

May 30, 2002    (FR) .................................. 02 06605

(51) Int. Cl.
*H02H 1/00*    (2006.01)

(52) U.S. Cl. ...................... 361/117; 361/133; 361/135; 361/137; 335/16; 335/147; 335/195; 218/22

(58) Field of Classification Search ................ 361/2–9, 361/111, 115, 117, 118, 129–138; 335/6, 335/12, 15, 16, 147, 185, 194, 195; 218/22
See application file for complete search history.

(56) References Cited

U.S. PATENT DOCUMENTS

| 1,645,287 | A  | * | 10/1927 | Davis et al. ................. 361/137 |
| 1,717,192 | A  | * | 6/1929  | Crocker ...................... 361/133 |
| 4,847,455 | A  | * | 7/1989  | Valdemarsson ................ 218/1   |
| 5,281,776 | A  |   | 1/1994  | Morel et al. |
| 6,097,246 | A  | * | 8/2000  | Tsurunaga et al. .......... 327/599 |
| 6,373,675 | B1 | * | 4/2002  | Yamazaki et al. .......... 361/135 |

FOREIGN PATENT DOCUMENTS

| EP | 0 048 545    | 3/1982 |
| EP | 0 071 956    | 2/1983 |
| EP | 0 860 918 A1 | 8/1998 |

* cited by examiner

Primary Examiner—Ramon M. Barrera
(74) Attorney, Agent, or Firm—Steptoe & Johnson LLP

(57) ABSTRACT

A device for protection against voltage surges comprises a stationary electrode and a movable electrode arranged facing an arc extinguishing chamber. The movable electrode is driven by a mechanisms, by an electromechanical actuator and/or by an electromagnetic circuit. At rest, the movable electrode is situated at a distance from the stationary electrode. When a voltage surge occurs between the electrodes, an arc arises and extends in the chamber in which it is extinguished. If the arc continues, in particular in the case of a follow current of high energy, the movable electrode is driven to a disconnected position moving away from the stationary electrode, which has the effect of lengthening the arc even more in the chamber to facilitate its extinction and perform disconnection of the circuit. A pair of contacts may be associated in series to the electrodes, one of the contacts being stationary and the other being fixedly secured to the movable electrode. A spark gap can also be associated to the electrodes.

18 Claims, 5 Drawing Sheets

VOLTAGE SURGE PROTECTION DEVICE

BACKGROUND OF THE INVENTION

The invention relates to an apparatus designed to divert an electric current wave to earth when the voltage of a line exceeds a given threshold.

STATE OF THE PRIOR ART

In the document EP 0,071,956 there is described an electrical apparatus for protection against voltage surges comprising a spark gap, a circuit breaker and possibly a voltage dependent resistor, connected in series in a common case between two terminals, one connected to a power supply line, and the other one earthed. The electromagnetic trip device of the circuit breaker incorporates a time delay function of more than 5 milliseconds. In operation, the circuit breaker is closed but the spark gap is off. In the event of a voltage surge, the spark gap is turned on and enables the corresponding current wave to be diverted to earth. If the spark gap remains in the on state for more than 5 milliseconds, the circuit breaker trips and opens the circuit. An apparatus of this type is relatively costly as it requires several functions to be grouped without any real synergy between them. Moreover, the cumulated impedance of the spark gap, the circuit breaker and the conductor connecting them is high, which results in a high protection voltage.

SUMMARY OF THE INVENTION

The object of the invention is therefore to remedy the shortcomings of the state of the art, so as to propose a simple and compact device providing the same functions as the associations between a spark gap lightning arrester and circuit breaker of the state of the prior art.

For this purpose, the object of the invention is to provide a device for protection against voltage surges, comprising
  a first electrode,
  a second electrode,
  a first arc extinguishing chamber equipped with means for dissipating the energy produced by an arc drawn between the first electrode and the second electrode,
characterized in that the device comprises in addition:
  a movable support fixedly secured to the second electrode and movable with respect to the first electrode between a rest position and a withdrawn position, the second electrode being situated at a first, non nil, distance from the first electrode when the movable support is in the rest position, and moving away from the first electrode when the movable support moves from the rest position to the withdrawn position,
  drive means to drive the movable support from the rest position to the withdrawn position.

The electrodes of the device combine the role of the electrodes of a lightning arrester and that of the contacts of a circuit breaker, enabling a lower impedance to be maintained at the terminals of the device than in the case of a lightning arrester and circuit breaker connected in series. The drive means group several functions: they can contribute in certain circumstances to extinguishing an electric arc generated by a follow current. They can also serve the purpose of disconnecting the device at the end of life. The device obtained is particularly compact.
  the device in addition comprises a stop to prevent the mobile support from driving the second electrode to a distance from the first electrode that is smaller than the first distance, and/or a return spring to return the movable support to the rest position. These arrangements enable the distance between the first and second electrode in the rest position to be controlled with precision.

Advantageously, the drive means include a mechanism comprising:
  an energy storage device with a spring movable between a loaded position and a relaxed position,
  a kinematic linkage connecting the energy storage device to the movable support to drive the movable support from the rest position to the withdrawn position when the energy storage device goes from the loaded position to the relaxed position,
  a catch to latch the energy storage device in the loaded position.

The mechanism is advantageously a circuit breaker mechanism. The functions sought for are thus obtained with great simplicity and by means of a mechanism the dependability whereof is perfectly mastered. The mechanism preferably comprises in addition a trip means to unlatch the catch when the current flowing through the first electrode and the second electrode and/or the electrical potential difference between the first electrode and the second electrode fulfil a condition detected by detection means.

Advantageously, the drive means include an electromagnetic circuit to induce electromagnetic forces on the second electrode and/or the movable support tending to drive the movable support to the withdrawn position when a current is flowing in the second electrode. By this means, the drive means are conferred a great speed, which enables a certain follow current limiting to be ensured, enhancing extinction thereof.

It can also be provided for the drive means to include an electromechanical relay equipped with a striker that strikes the movable support to drive the movable support to the withdrawn position when an opening condition is detected. The relay can be of any suitable known type. It can in particular be an electromagnetic relay, a piezoelectric actuator or a Thomson effect actuator.

Preferably, the device in addition comprises starting means to start an electric arc between the first electrode and the second electrode. Ignition of the electric arc can thus be controlled with precision even if the environment in which the electrodes are bathed has a fluctuating dielectric characteristic. The electrodes therefore do not have to be arranged in a sealed enclosure containing a gas whose dielectric characteristics would be controlled with precision. According to one embodiment, the starting means comprise:
  a detection circuit to detect an electrical potential difference between the first electrode and the second electrode and
  a starting circuit to start an arc between the stationary electrode and the movable electrode when the electrical potential difference between the first electrode and the second electrode fulfils a preset condition.

To obtain a particularly simple and compact starting circuit, the latter comprises:
  a starting electrode for igniting an electric arc between the first electrode and the second electrode,
  a circuit to generate a starting voltage between the starting electrode and one of the first and second electrodes.

Advantageously, the drive means comprise reinitialization means to drive the movable support from the withdrawn position to the rest position. An apparatus enabling restarting is thus obtained. Return to the rest position can be performed either manually, the energy being supplied by an operator acting on a handle, or automatically by means of a motor. According to one embodiment, the reinitialization means comprise a return spring to return the movable support to the rest position. The return spring can be distinct from the energy storage system spring. It can also be the same as the latter, in a Tumbler type mechanism.

Advantageously, the device in addition comprises display means to indicate that the movable support is in the withdrawn position. If the apparatus is provided with a handle associated to the mechanism, this handle can act as display means.

Advantageously, the device in addition comprises a pair of connecting strips to connect the device to an electric line and to earth, the pair of connecting strips being composed of a first connecting strip in permanent electrical connection with the first electrode, and a second connecting strip in electrical connection with the second electrode at least when the movable support is in the rest position.

According to one embodiment, the second electrode is in permanent electrical connection with the second connecting strip.

To improve mastery of the ignition phase, the following can be provided:
 a third stationary electrode arranged between the first electrode and the second electrode, at a fixed distance from the first electrode,
 a fourth stationary electrode arranged between the third electrode and the second electrode, the fourth electrode being in permanent electrical connection with the third electrode, the second electrode in the rest position being in contact with the fourth electrode, the second electrode in the withdrawn position being separated from the fourth electrode, the arc extinguishing chamber being provided with means for dissipating the energy produced by an arc drawn between the third electrode and the first electrode.

Such an embodiment proves particularly well suited to low power installations.

Alternatively, the following can be provided, in particular for higher power installations:
 a third electrode,
 a fourth electrode fixedly secured to the movable support and in permanent electrical connection with the second electrode, the fourth electrode being in a contact position with the third electrode when the movable support is in the rest position, and in a separated position, at a distance from the third electrode when the movable support is in the withdrawn position,
 a second arc extinguishing chamber provided with means for dissipating the energy produced by an arc drawn between the third electrode and the fourth electrode.

More precisely, the device can comprise:
 a pair of connecting strips to connect the device to an electric line and to earth, the pair of connecting strips being composed of a first connecting strip in permanent electrical connection with the first electrode which is stationary, and a second connecting strip in electrical connection with the second electrode at least when the movable support is in the rest position,
 a third, stationary, electrode, in permanent electrical connection with the second connecting strip,
 a fourth electrode, fixedly secured to the movable support mobile and in permanent electrical connection with the second electrode, the fourth electrode being in a contact position with the third electrode when the movable support is in the rest position, and in a separated position, at a distance from the third electrode when the movable support is in the withdrawn position,
 a second arc extinguishing chamber provided with means for dissipating the energy produced by an arc drawn between the third electrode and the fourth electrode.

BRIEF DESCRIPTION OF THE FIGURES

Other advantages and features will become more clearly apparent from the following description of particular embodiments of the invention given as non-restrictive examples only and represented in the accompanying drawings in which.

DETAILED DESCRIPTION OF AN EMBODIMENT

Figure 1:
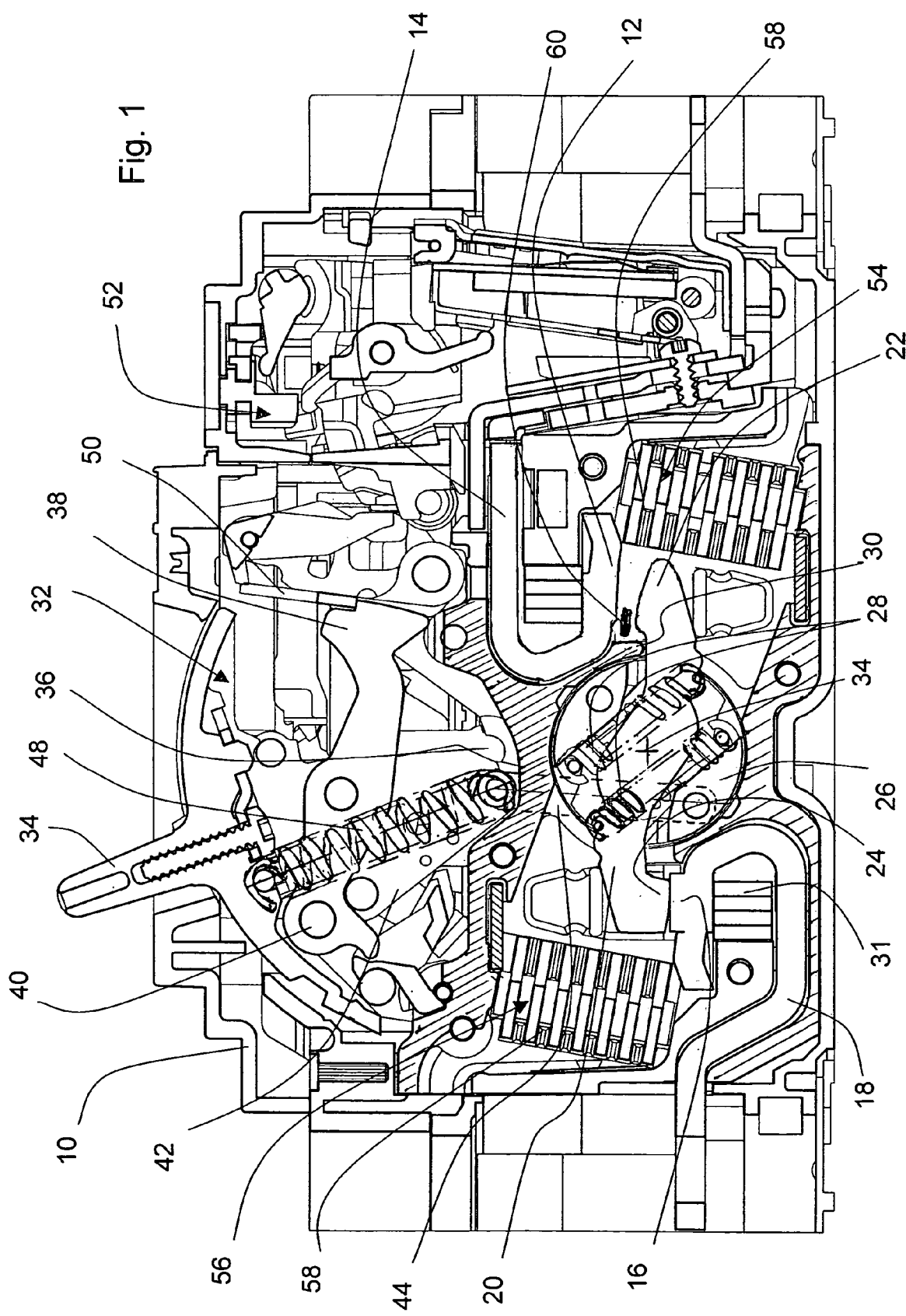
FIG. 1 represents a device according to a first embodiment, in the initial position.
Figure 2:
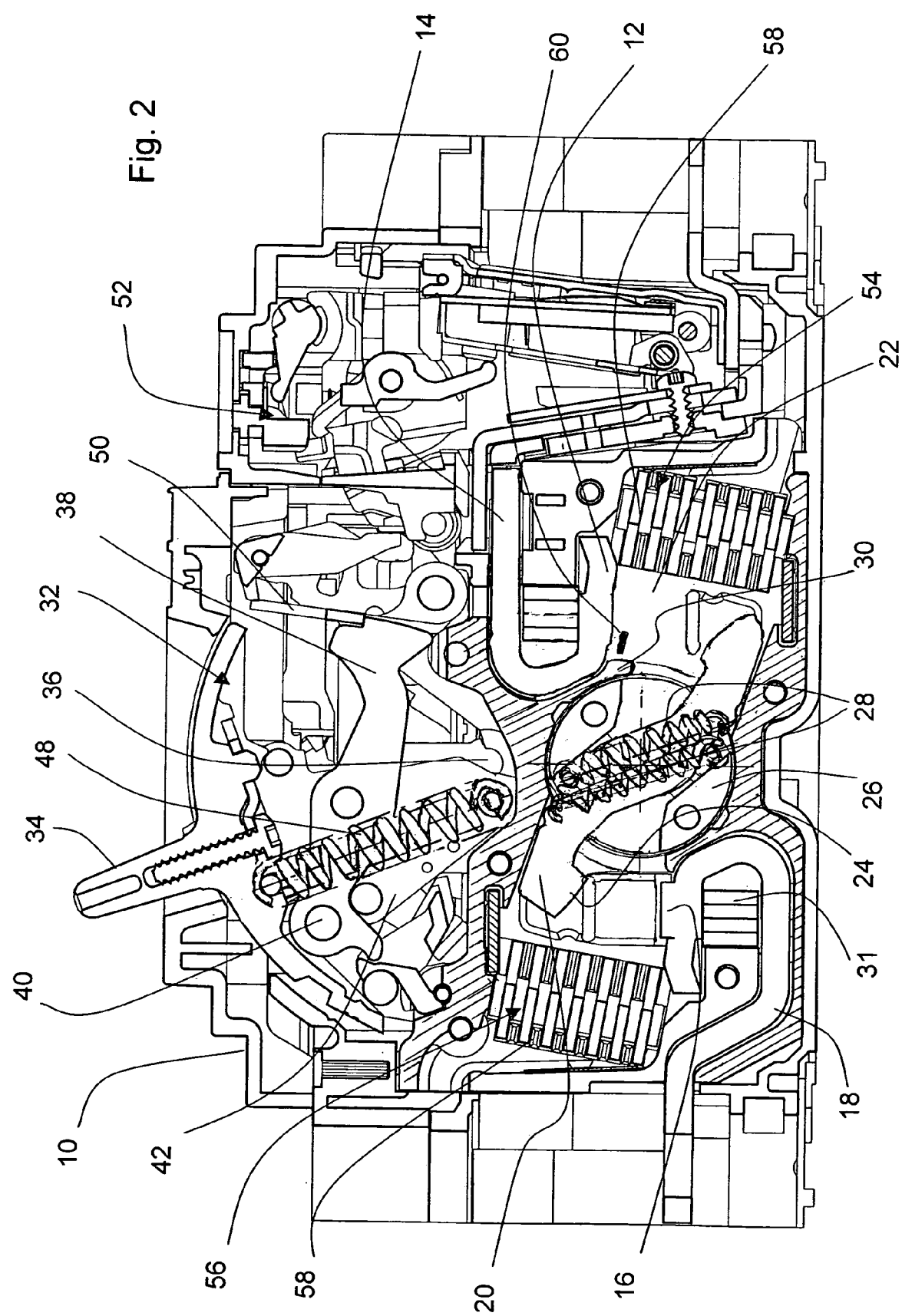
FIG. 2 represents the device of FIG. 1, in a repulsion position.
Figure 3:
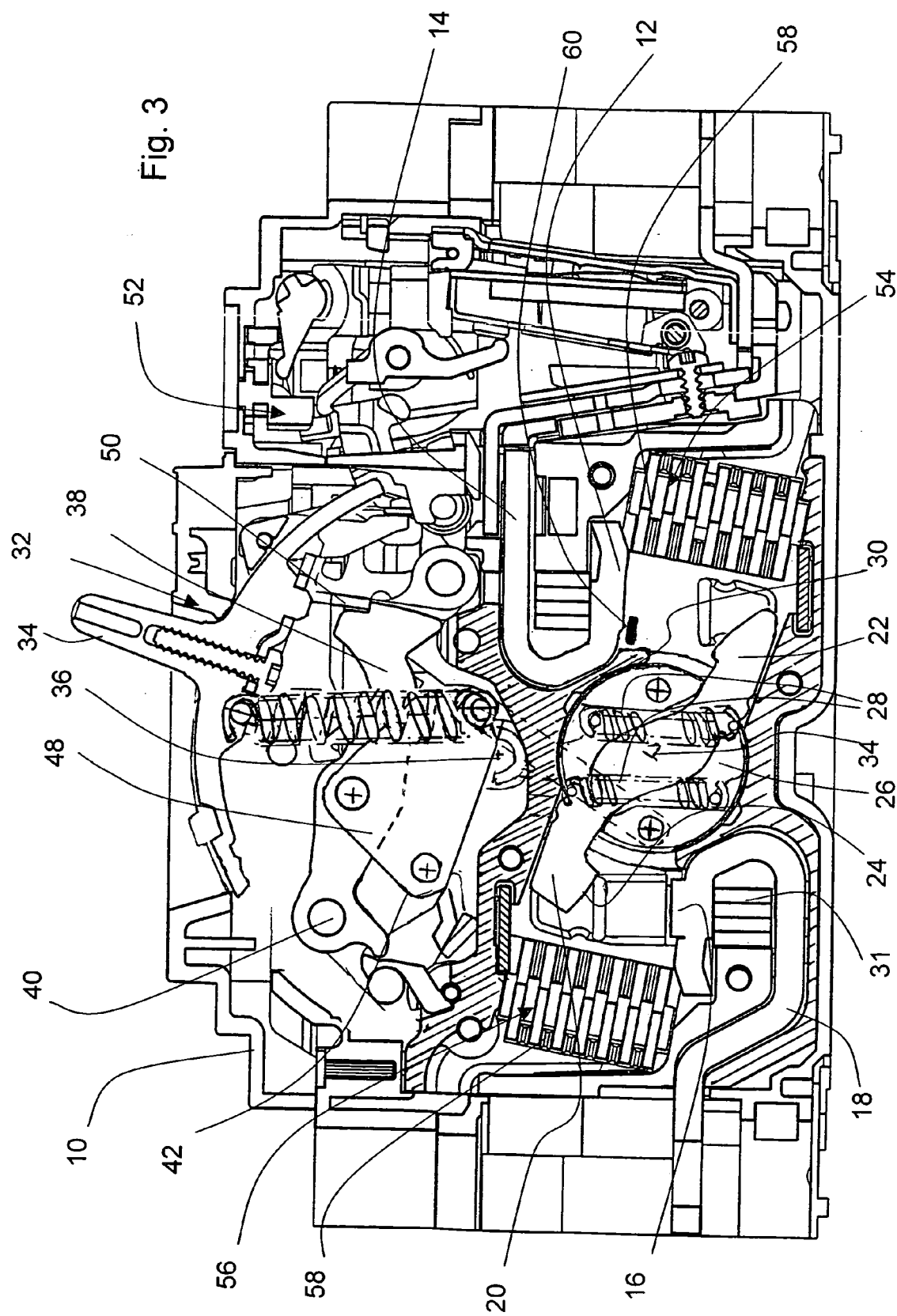
FIG. 3 represents the device of FIG. 1, in a tripped position.

With reference to FIGS. 1 to 3, a device according to a first embodiment of the invention comprises, inside a case made of insulating synthetic material 10, a stationary electrode 12 connected to a connecting strip 14, a stationary contact 16 connected to another connecting strip 18, and a metal bridge 20 comprising, at one end thereof, a movable electrode 22 arranged facing the stationary electrode 12 and, at the opposite end thereof, a movable contact 24 arranged facing the stationary contact 16. The bridge 20 is mounted on a shaft 26 by means of return springs 28, which tend to bias the bridge 20 in the direction urging the movable contact 24 towards the stationary contact 16. The bridge 20 is designed to move, with respect to the shaft 26, from the rest position represented in FIG. 1 to the withdrawn position represented in FIG. 2. A stop 30 fixedly secured to the case and against which the bridge 20 strikes, prevents any movement of the electrodes closer to one another than the rest position. The connecting strips 14 and 18 are in the shape of a C which concentrates the field lines induced when a current flows therethough. Moreover, the strip 18 surrounds a U-shaped magnetic circuit 31 which concentrates the field lines even more in the zone of the contacts 16, 24. The shaft 26 is driven by a mechanism 32 and pivots around an imaginary geometric axis 34 perpendicular to the plane of the figures between the closed position represented in FIG. 1 and the disconnected position represented in FIG. 3. This mechanism is a double-break circuit breaker mechanism of known type described in greater detail for example in the document FR 2,684,249. This mechanism comprises a handle 34 pivoting around a fixed axis 36, a latch 38 pivoting around a fixed axis 40, a first rod 42 articulated on the latch 38, a second rod 44 articulated on the first rod 42 and on the shaft 26, a tension spring 48 fitted between the handle 34 and the articulation of the rod system 42, 44, and a catch 50 to hook the latch 38 in the position of FIG. 1. The catch is operated by an electromechanical relay 52.

An arc extinguishing chamber 54 is arranged facing the electrodes 12, 22, and another chamber 56 facing the contacts. Each chamber 54, 56 is provided with cooling fins 58 designed to cool the electric arc.

Figure 4:
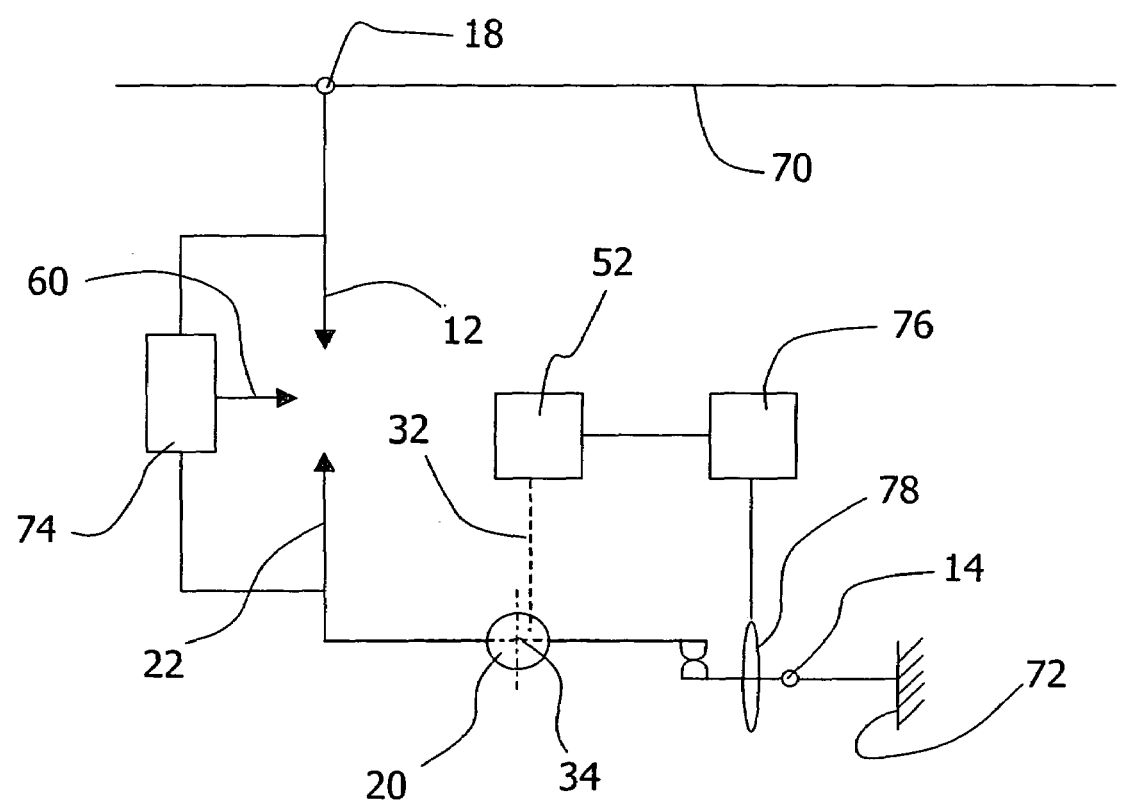
FIG. 4 represents a wiring diagram of the device of FIG. 1, inserted in an electric voltage surge protection circuit.

As represented schematically in FIG. 4, the device is connected via one of its connecting strips to an electric line 70, and is connected via the other connecting strip to earth 72, without a particular connecting direction being prescribed. A starting electrode 60 is arranged between the two electrodes 12, 22. The starting electrode 60 is controlled by an electric starting circuit 74 connected between the bridge and the stationary electrode. The electric starting circuit 74 detects the electrical potential difference between the movable electrode 22 and the stationary electrode 12. A trip device 76 detects the intensity of the current flowing to earth by means of a measuring toroid, and commands the electromechanical relay 52. There is moreover associated to the trip device a system for detection, recording and transmission of information characteristic of the voltage surges at the terminals of the device and of the currents flowing in the device, and in particular on the number of lightning flashes, the maximum value of the lightning flashes recorded and the duration of the lightning flashes.

The device operates in the following manner:

The device is normally in the rest position represented in FIG. 1. The circuit between the connecting strips 14, 18 is open due to the clearance existing between the electrodes 12, 22. When a voltage surge occurs on the line, for example a voltage surge due to lightning, a potential difference is detected by the starting circuit 74. If this potential difference exceeds a given threshold, the starting circuit 74 raises the starting electrode 60 to a sufficient potential to make an arc strike between the electrodes 12, 22. This arc closes the electric circuit between the connecting strips 14, 18 without any movement of the bridge 20 taking place, and enables the current wave to flow to earth. Due to the C-shaped configuration of the connecting strip 14, the electric arc is projected to the arc extinguishing chamber 54, which absorbs a part of the energy emitted by the electric arc, makes the arc voltage increase and enables the arc to be extinguished.

However, if the arcing current intensity is very high, the connecting strip 14 and connecting strip 18, reinforced by the magnetic circuit 31, produce sufficient repulsive electromagnetic forces on the contact bridge 20 to cause pivoting of the contact bridge 20, against the bias of the return springs 28, without any movement of the shaft 26, until the position of FIG. 2 is reached. This movement causes a separation between the movable contact 24 and the stationary contact 16. A secondary electric arc arises between the contacts 16, 24. This secondary electric arc is projected to the arc extinguishing chamber 56 by the effect of the electromagnetic forces generated by the C-shape configuration of the connecting strip 18. The two arcs in series lengthen even more as the bridge 20 approaches the withdrawn position due to the increasing distance between the electrodes 12, 22, and between the contacts 16, 24. The voltage between the connecting strips 14, 18 when the initial current wave passes is such that there is no limiting effect of the initial wave. The arcing voltage cumulated by the two arcs in series is on the other hand sufficient to greatly limit, or even totally eliminate the follow current. The arcs are extinguished and the device regenerates as soon as the current wave has passed.

However, if the electric arc between the electrodes continues for longer than a preset time, the trip device 76 detects this malfunctioning and commands opening of the mechanism 32 which drives the shaft and bridge to the position of FIG. 3. In this position, disconnection between the line and earth is ensured by the cumulated distances in the air between the bridge 20 and stationary electrode 12 on the one hand, and between the bridge 20 and stationary contact 16 on the other hand. The disconnected state is indicated by the handle 34 and/or by any suitable indication lamp or indicator. Tripping of the mechanism is therefore caused in exceptional conditions, guaranteeing selectivity in the breaking means of the circuit established between the line and earth.

The mechanism is also provided with a thermal release performing long delay tripping. Thus, if a malfunction occurs between the electrodes causing a spurious electric arc establishing the current between the line and earth, the mechanism opens and performs disconnection between the line and earth.

The mechanism can if required be closed by means of the handle to return to the rest state of FIG. 1. The mechanism can therefore be reclosed after a maintenance operation.

Various alternative embodiments can be envisaged. In particular, the stop 30 that guarantees the distance between the movable electrode and the stationary electrode can be located at any place enabling it to perform its function. The drive mechanism can notably be of any known type for driving circuit breaker contacts. It can notably include a distinct closing spring and opening spring. The movable electrode can if desired be driven in translation rather than in rotation.

Electromagnetic repulsion is optional. It is in fact possible to go directly from a current flow phase without movement of the electrodes to an opening phase of the electrodes by the mechanism.

According to an alternative embodiment, not represented, it is also possible to conceive a device symmetrical with respect to the geometric axis of rotation 34, wherein the pair of contacts 16, 24 would be replaced by a pair of electrodes identical to the electrodes 12 and 20, between which a starting electrode identical to the electrode 60 would be arranged.

It is also possible to transpose the described principle to a single-break structure, not comprising a pair of contacts, but only a stationary electrode and a movable electrode arranged facing a single extinguishing chamber.

Figure 5:
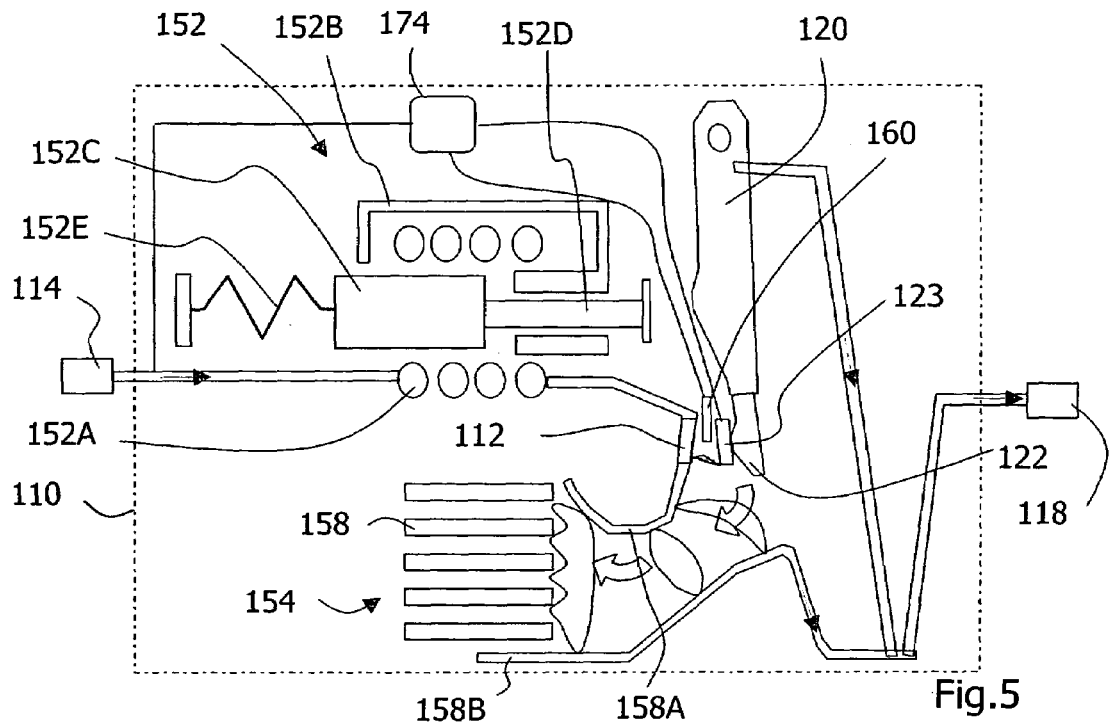
FIG. 5 represents a device according to a second embodiment, in the initial position.
Figure 6:
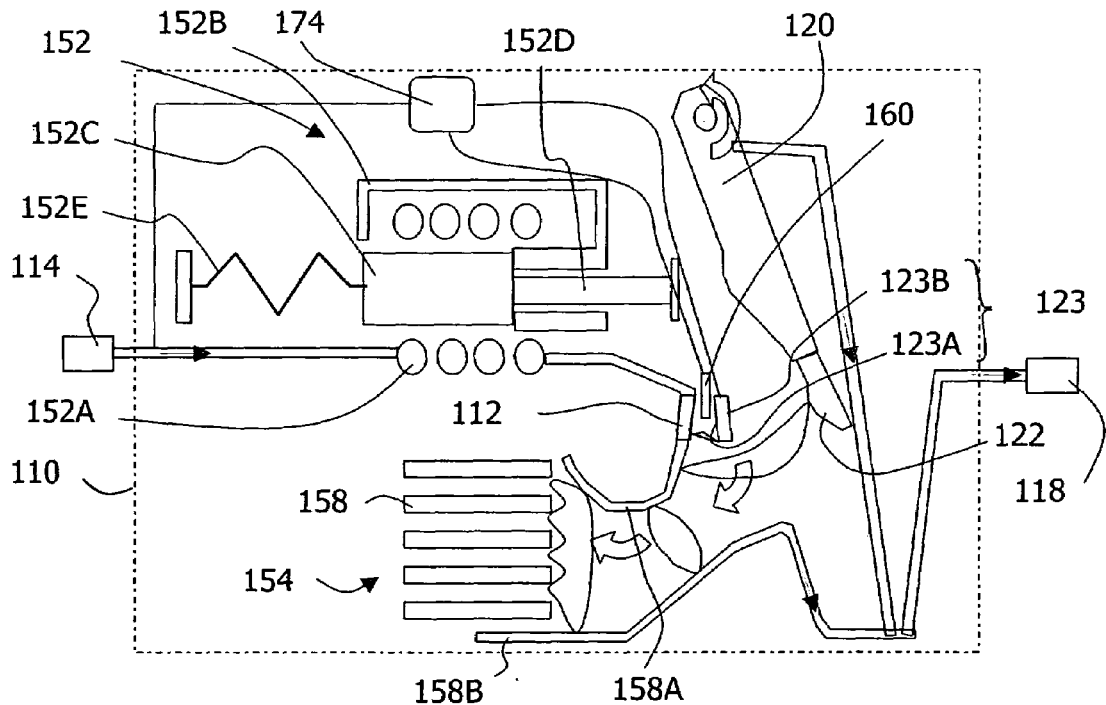
FIG. 6 represents the device of FIG. 5, in the withdrawn position.

With reference to FIGS. 5 and 6, a device according to a second embodiment of the invention comprises, housed in a case made of insulating material 110, a stationary electrode 112 connected to a connecting strip 114, a movable electrode 122 supported by an arm 120 swivelling around a fixed axis and connected to a connecting strip 118, and a stationary conducting pad 123 presenting a face constituting a stationary electrode 123A (FIG. 6) facing the electrode 112 and an opposite face 123B (FIG. 6) constituting a contact electrode whereon the movable contact electrode 122 rests. The electrodes are arranged facing an extinguishing chamber 154 equipped with cooling fins 158. The chamber 154 is provided with a lower arcing horn 158A electrically connected to the stationary electrode 112 and with an upper arcing horn 158B connected to the connecting strip 118.

A starting electrode 160 controlled by a starting circuit 174 detecting a potential difference between the connecting strip 114 and pad 123 is arranged between the stationary electrode and the pad. An electromechanical relay 152 is arranged facing the swivelling arm. The relay comprises a coil 152A connected in series between the connecting strip 114 and the stationary electrode 112, a yoke 152B forming a magnetic circuit, a mobile armature 152C extended by a striker 152D and a return spring 152E to return the armature to a rest position by means of a spring, to the left in FIGS. 5 and 6.

In operation, one of the connecting strips 114, 118 is connected to an electric line and the other is earthed. The device is not in the on state, as the stationary electrode 112 is arranged at a distance from the electrode 123A of the pad 123. If the potential difference between the stationary electrode 112 and the pad 123 exceeds a preset threshold, the starting electrode 160 is raised by the starting circuit 174 to a voltage such that an arc is ignited between the starting electrode and one of the electrodes. This arc is immediately established between the stationary electrode 112 and the pad 123, and the electric current finds a path between the connecting strips, passing via the stationary electrode 112, the pad 123, the movable electrode 122 and the arm 120 in the rest position. The loop shape of the electrode 112 induces on the arc electromagnetic forces propelling the arc to the chamber. The arc therefore switches on the arcing horns 158A, 158B and penetrates into the chamber to be extinguished therein at the end of the current wave. Extinction of the arc opens the circuit and the line is isolated from earth. The total lifetime of the arc, which is a few tens of microseconds, is sufficiently short for the relay not to operate, due to its inertia.

Under certain circumstances however, an electric arc can continue to exist between the electrode 112 and pad 123, either due to a follow current or due to a degradation of the electrodes with time. In such a case, the electromechanical relay is supplied for a sufficiently long time to drive the movable assembly 152C, the end 152D whereof strikes the arm 120 and projects it to the withdrawn position, as represented in FIG. 6. The arc then switches between the stationary electrode and the movable electrode and lengthens until it enters the chamber where it is extinguished. A latch can be provided to prevent the arm 120 from dropping back. A resetting mechanism can be provided to enable the arm to return to the rest position.

Naturally, various modifications are possible.

In the second embodiment, it is not necessary for the upper arcing horn to be electrically connected to the connecting strip. Moreover, a device ensuring a contact pressure can also be provided for the second embodiment.

Starting is optional. Starting can be performed by any suitable means. It can in particular be achieved by means of a couple of starting electrodes enabling the gas to be ionized between the stationary electrode and the movable electrode.

What is claimed is:

1. Device for protection against voltage surges, comprising
   a first electrode,
   a second electrode,
   a first arc extinguishing chamber equipped with means for dissipating the energy produced by an arc drawn between the first electrode and the second electrode,
   a movable support fixedly secured to the second electrode and movable with respect to the first electrode between a rest position and a withdrawn position, the second electrode being situated at a first, non nil, distance from the first electrode when the movable support is in the rest position, and moving away from the first electrode when the movable support moves from the rest position to the withdrawn position, and
   drive means to drive the movable support from the rest position to the withdrawn position.

2. Device according to claim 1, comprising in addition:
   a stop to prevent the movable support from driving the second electrode to a distance from the first electrode that is smaller than the first distance.

3. Device according to claim 1, comprising in addition:
   a return spring to return the movable support to the rest position.

4. Device according to claim 1, wherein the drive means include a mechanism comprising:
   an energy storage device with a spring movable between a loaded position and a relaxed position,
   a kinematic linkage connecting the energy storage device to the movable support to drive the movable support from the rest position to the withdrawn position when the energy storage device goes from the loaded position to the relaxed position,
   a catch to latch the energy storage device in the loaded position.

5. Device according to claim 4, wherein the mechanism comprises in addition:
   a trip means to unlatch the catch when the current flowing through the first electrode and the second electrode and/or the electrical potential difference between the first electrode and the second electrode fulfil a condition detected by detection means.

6. Device according to claim 1, wherein the drive means include an electromagnetic circuit to induce electromagnetic forces on the second electrode and/or the movable support tending to drive the movable support to the withdrawn position when a current is flowing in the second electrode.

7. Device according to claim 1, wherein the drive means include an electromechanical relay equipped with a striker that strikes the movable support to drive the movable support to the withdrawn position when an opening condition is detected.

8. Device according to claim 1, comprising in addition:
   starting means to start an electric arc between the first electrode and the second electrode.

9. Device according to claim 8, wherein the starting means comprise:
   a detection circuit to detect an electrical potential difference between the first electrode and the second electrode and
   a starting circuit to start an arc between the stationary electrode and the movable electrode when the electrical potential difference between the first electrode and the second electrode fulfils a preset condition.

10. Device according to claim 9, wherein the starting circuit comprises:
    a starting electrode for igniting an electric arc between the first electrode and the second electrode,
    a circuit to generate a starting voltage between the starting electrode and one of the first and second electrodes.

11. Device according to claim 1, wherein the drive means comprise reinitialization means to drive the movable support from the withdrawn position to the rest position.

12. Device according to claim 11, wherein the reinitialization means comprise a return spring to return the movable support to the rest position.

13. Device according to claim 1, comprising in addition display means to indicate that the movable support is in the withdrawn position.

14. Device according to claim 1, comprising in addition:
    a pair of connecting strips to connect the device to an electric line and to earth, the pair of connecting strips being composed of a first connecting strip in permanent electrical connection with the first electrode, and a second connecting strip in electrical connection with the second electrode at least when the movable support is in the rest position.

15. Device according to claim 14, wherein the second electrode is in permanent electrical connection with the second connecting strip.

16. Device according to claim 1, comprising in addition:
- a third stationary electrode arranged between the first electrode and the second electrode, at a fixed distance from the first electrode,
- a fourth stationary electrode arranged between the third electrode and the second electrode, the fourth electrode being in permanent electrical connection with the third electrode, the second electrode in the rest position being in contact with the fourth electrode, the second electrode in the withdrawn position being separated from the fourth electrode, the arc extinguishing chamber being provided with means for dissipating the energy produced by an arc drawn between the third electrode and the first electrode.

17. Device according to claim 1, comprising in addition:
- a third electrode,
- a fourth electrode fixedly secured to the movable support and in permanent electrical connection with the second electrode, the fourth electrode being in a contact position with the third electrode when the movable support is in the rest position, and in a separated position, at a distance from the third electrode when the movable support is in the withdrawn position,
- a second arc extinguishing chamber provided with means for dissipating the energy produced by an arc drawn between the third electrode and the fourth electrode.

18. Device according to claim 1, comprising in addition:
- a pair of connecting strips to connect the device to an electric line and to earth, the pair of connecting strips being composed of a first connecting strip in permanent electrical connection with the first electrode which is stationary, and a second connecting strip in electrical connection with the second electrode at least when the movable support is in the rest position,
- a third, stationary, electrode, in permanent electrical connection with the second connecting strip,
- a fourth electrode, fixedly secured to the movable support mobile and in permanent electrical connection with the second electrode, the fourth electrode being in a contact position with the third electrode when the movable support is in the rest position, and in a separated position, at a distance from the third electrode when the movable support is in the withdrawn position,
- a second arc extinguishing chamber provided with means for dissipating the energy produced by an arc drawn between the third electrode and the fourth electrode.

* * * * *